United States Patent
Bzducha et al.

(10) Patent No.: US 10,006,586 B2
(45) Date of Patent: Jun. 26, 2018

(54) GAS STORAGE TANK

(71) Applicant: RHODIA OPERATIONS, Paris (FR)

(72) Inventors: Wojciech Bzducha, Courbevoie (FR); Franco Speroni, Ceriano Laghetto (IT)

(73) Assignee: Rhodia Operations, Aubervilliers (FR)

( * ) Notice: Subject to any disclaimer, the term of this patent is extended or adjusted under 35 U.S.C. 154(b) by 336 days.

(21) Appl. No.: 14/434,872

(22) PCT Filed: Oct. 8, 2013

(86) PCT No.: PCT/EP2013/070907
§ 371 (c)(1),
(2) Date: Apr. 10, 2015

(87) PCT Pub. No.: WO2014/056887
PCT Pub. Date: Apr. 17, 2014

(65) Prior Publication Data
US 2015/0285438 A1    Oct. 8, 2015

(30) Foreign Application Priority Data

Oct. 10, 2012 (FR) .................................... 12 02704
Dec. 21, 2012 (FR) .................................... 12 62536

(51) Int. Cl.
| | | |
|---|---|---|
| *F17C 1/10* | (2006.01) | |
| *C08J 5/18* | (2006.01) | |
| *C08G 69/08* | (2006.01) | |
| *C08G 69/14* | (2006.01) | |
| *C08L 77/02* | (2006.01) | |
| *B29C 49/04* | (2006.01) | |
| *B29K 77/00* | (2006.01) | |
| *B29L 31/00* | (2006.01) | |

(52) U.S. Cl.
CPC .............. *F17C 1/10* (2013.01); *B29C 49/04* (2013.01); *C08G 69/08* (2013.01); *C08G 69/14* (2013.01); *C08J 5/18* (2013.01); *C08L 77/02* (2013.01); *B29K 2077/00* (2013.01); *B29L 2031/7172* (2013.01); *C08J 2377/02* (2013.01); *F17C 2203/0604* (2013.01); *F17C 2203/066* (2013.01); *F17C 2203/0607* (2013.01); *F17C 2203/0663* (2013.01); *F17C 2203/0675* (2013.01); *F17C 2209/2127* (2013.01); *F17C 2221/012* (2013.01); *F17C 2221/033* (2013.01); *F17C 2223/036* (2013.01); *Y02E 60/321* (2013.01)

(58) Field of Classification Search
CPC .................. C08G 69/36; F17C 1/10
See application file for complete search history.

(56) References Cited

U.S. PATENT DOCUMENTS

| | | | | |
|---|---|---|---|---|
| 6,867,256 | B1 * | 3/2005 | Di Silvestro | C08G 69/00 524/606 |
| 6,872,800 | B1 * | 3/2005 | Bouquerel | C08G 69/04 525/420 |
| 2006/0124906 | A1 * | 6/2006 | Bradley | C08K 3/08 252/500 |
| 2009/0203845 | A1 | 8/2009 | Fukui et al. | |
| 2013/0131269 | A1 | 5/2013 | Davezac et al. | |

FOREIGN PATENT DOCUMENTS

| | | |
|---|---|---|
| DE | 202010017414 U1 | 1/2012 |
| EP | 2457952 A1 | 5/2012 |
| FR | 2793252 A1 | 11/2000 |
| FR | 2958296 A1 | 10/2011 |
| WO | 99 03909 * | 1/1999 |
| WO | WO 9903909 A1 | 1/1999 |
| WO | 00 68298 * | 1/2000 |
| WO | WO 2012076677 A2 | 6/2012 |

OTHER PUBLICATIONS

Rule 110 of the EEC-UNO—Uniform prescriptions relating to authorization: I. Special members for feeding vehicle engines with compressed natural gas (CNG); II. Vehicles equipped with special members of a type authorized for feeding an engine with compressed natural gas (CNG) as regards the installation of these members, Additive 109: rule 110—Complement 6 to the original version of the Rule—Date of entry into force: Jun. 18, 2007, (197 pages).
In-house procedure of TesTneT Engineering GmbH D-80802 Munich: # 110315_stu_Prüfanweisung Plattenpermeation CH4 Rev02, (8 pages).

* cited by examiner

*Primary Examiner* — Kuo Liang Peng
(74) *Attorney, Agent, or Firm* — Osha Liang LLP

(57) ABSTRACT

The present invention relates to a gas storage tank, for storing gas, especially CNG, methane and/or hydrogen, said tank comprising a liner comprising a high-viscosity polyamide composition comprising a branched polyamide and an impact modifier, and to a process for manufacturing said the tank. More particularly, the composition comprises a copolyamide of the random tree type resulting from the reaction between a multifunctional monomer comprising at least three reactive functions to form an amide function, these functions being of two different types, difunctional monomers conventionally used in the manufacture of linear polyamides, and optionally difunctional monomers.

19 Claims, No Drawings

GAS STORAGE TANK

CROSS-REFERENCED TO RELATED APPLICATIONS

This application is a U.S. national stage entry under 35 U.S.C. § 371 of International Application No. PCT/EP2013/070907, filed Oct. 8, 2013, which claims priority to French applications No. FR 12 02704 filed on 10 Oct. 2012 and FR 12 62536 filed on 21 Dec. 2012, the whole content of these applications being incorporated herein by reference for all purposes.

The invention relates to a gas storage tank comprising a liner comprising a high-viscosity polyamide composition comprising a branched polyamide, to a process for manufacturing said tank. More particularly, the composition comprises a copolyamide of the random tree type resulting from the reaction between a multifunctional monomer comprising at least three reactive functions for forming amide functions, these functions being of two different types, and difunctional monomers of amino acid or lactam type conventionally used in the manufacture of linear polyamides. The copolyamide obtained has a very low melt flow index relative to the corresponding linear polyamide.

In general, gas storage tanks, in particular for storing compressed natural gas, known as CNG, are in the form of a thin, non-structural liner surrounded with a structural composite fibre for containing the fluid or gas under pressure. The liner especially acts as a barrier between the fluid or gas and the composite, thus preventing leaks and/or other degradations of the structure of the composite fibre.

The prior art describes in general composites in the form of polymers reinforced with fibres. The liners most commonly used are based on polyethylene. This type of tank has certain advantages over metal tanks, especially in terms of weight; they may, however, prove to be unsatisfactory for certain properties, for example in terms of permeability, protection of the composite layer and/or durability. In particular, they may prove to be unsatisfactory as regards the number of service cycles for which they make it possible to have a tank with satisfactory or even optimum properties.

More recently, polyamide-based liners have been described in WO 2012/076 677. However, the said document describes a complex composition especially involving a nucleating agent and involves an intricate implementation, especially in terms of temperature during the transformation step, i.e. during the step of manufacture of the liner.

Document US 2009/0 203 845 relates to a hydrogen tank comprising a liner comprising a composition based on polyamide (in particular PA6), copolyamide (in particular PA6/66) and an impact modifier. This liner is obtained by injection moulding and/or laser welding. These liners may have unsatisfactory permeability to gas, and in particular to CNG, may not enable an easy process for manufacturing the liner, and may require a relatively high transformation temperature, especially due to the presence of two different polyamides. Moreover, the compositions described in the said document are adapted to an injection moulding process.

Document DE 202010017414 describes a multi-component composition consisting of at least one (co)polyamide, an impact modifier, a chain extender and a polyolefin acrylic ester copolymer. These compositions especially have a relatively low viscosity, and may prove to be unsatisfactory for obtaining a liner by blow moulding. This composition especially involves a relatively complex composition and/or a relatively high content of chain extender.

Moreover, one of the main problems for the 2D or 3D extrusion blow-moulding process is the production of a parison having a good consistency and good cohesion and also good melt strength during extrusion, i.e. a sufficient resistance to gravity. The reference plastic for such a process, which affords good strength of the parison, is polyethylene, such as high-density polyethylene, for example for producing a monolayer jerrycan.

The design of hollow bodies intended for containing liquids and gases is consequently rapidly evolving towards techniques that are capable of better ensuring leaktightness and safety under varied working conditions. There is also a need to maximize the impermeability of these hollow bodies while at the same time proposing a simple implementation method such as monolayer extrusion blow-moulding.

There is thus a need to develop hollow bodies intended for transporting gases or fluids, which have high performance qualities in terms of impermeability, ease of implementation and various other properties such as elastic mechanical properties and impact strength, especially at low temperature.

The invention is thus directed towards totally or partially solving the problems mentioned above, and in particular towards providing a composition comprising simple, inexpensive components, which makes it possible to obtain a liner to be used in a gas storage tank, said liner having very low permeability to gases, in particular to CNG, i.e. methane, and/or to hydrogen, and which is very readily transformable via a technique of choice for mass production, especially by blow-moulding or extrusion blow-moulding.

Thus, the composition used in the present invention is particularly suited to production by extrusion blow-moulding, which is a method of choice for mass production, while at the same time having very good properties of impermeability to gases, especially to CNG, methane and/or hydrogen, coupled with good impact strength properties. These last two properties are crucial in the context of the present invention, i.e. in the case of liners for pressurized gas tanks.

Moreover, the composition used is very "simple", i.e. it especially comprises very few components, and can afford good results even without chain extenders, without elastomer of acrylic type or based on modified polyolefins, and/or without compatibilizer.

In addition, the extrusion blow-moulding process using the composition according to the invention is a robust technique, which is easy to perform and very cost-competitive.

According to a first aspect, a subject of the invention is a gas storage tank, in particular for CNG and/or hydrogen, comprising a liner comprising, or even consisting of, a composition comprising, or even consisting of:

a) a copolyamide having a structure of the random tree type, which is the result of the reaction between at least, or even between solely:

at least one, or even one, multifunctional monomer corresponding to the general formula I below:

in which: n is an integer between 2 and 10, limits inclusive, $R^1$ and $R^2$ may be identical or different and represent a covalent bond, an aliphatic, arylaliphatic, aromatic or alkylaromatic hydrocarbon-based radical, R is a linear or branched aliphatic radical, a substituted or unsubstituted cycloaliphatic radical, a substituted or unsubstituted aromatic radical which may comprise several aromatic nuclei and/or hetero ketones, A represents an amine or amine salt function, or an acid, ester, acid halide or amide function, B represents an amine or amine salt function when A represents an acid, ester, acid halide or amide function, and an acid, ester, acid halide or amide function when A represents an amine or amine salt function, at least one, or even one, difunctional monomer corresponding to the general formula II below:

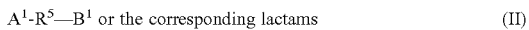

$$A^1-R^5-B^1 \text{ or the corresponding lactams} \quad (II)$$

optionally at least one, or even one, difunctional monomer of formula (III) when B is an amine or equivalent function, or a monomer of formula (IV) when B represents an acid or equivalent function,

$$A^1-R^3-A^1 \quad (III) \text{ or}$$

$$B^1-R^4-B^1 \quad (IV)$$

in which: $A^1$ and $B^1$ represent, respectively, an acid, ester or acid chloride function, and an amine or amine salt function, $R^3$, $R^4$ and $R^5$ represent linear or branched alkyl, substituted or unsubstituted aromatic, alkylaryl, arylalkyl or cycloaliphatic hydrocarbon-based radicals which may comprise unsaturations, in particular, the copolyamide content ranges from 65% to 90% by weight relative to the total weight of the composition;
b) at least one impact modifier,
especially in a content ranging from 5% to 30% by weight relative to the total weight of the composition;
c) optionally at least one chain extender,
especially in a content ranging from 0.5% to 2% by weight relative to the total weight of the composition; and
d) optionally from 0 to 5% of additives, chosen especially from lubricants, flame retardants, plasticizers, catalysts, light and/or heat stabilizers, antioxidants, antistatic agents, dyes, matting agents and moulding additives, in particular, the said additives are present in a maximum total content of 2% by weight relative to the total weight of the composition.

The said tank generally comprises the said gases at a pressure of up to 200 bar and beyond.

According to another of its aspects, a subject of the invention is also a process for manufacturing the gas storage tank, as above detailed, including manufacturing the said liner by blow-moulding or extrusion blow-moulding, and assembling the same to structural components.

In particular, the liner of the gas storage tank of the present invention advantageously possesses a permeability to methane, when measured at 23° C. and at 200 bar on flat specimens, of less than or equal to 12 $Ncm^3/(m^2 \times h)$, preferably 10 $Ncm^3/(m^2 \times h)$, especially less than or equal to 5 $Ncm^3/(m^2 \times h)$, or even less than or equal to 2.5 $Ncm^3/(m^2 \times h)$, in particular less than or equal to 1 $Ncm^3/(m^2 \times h)$.

Permeability to methane can be determined according to the In-house procedure of TesTneT Engineering GmbH D-80802 Munich: #110315_stu_Prüfanweisung Plattenpermeation $CH_4$ Rev02.

Further, the liner of the gas storage tank of the present invention advantageously possesses a maximum permitted methane infiltration rate for a cylindric shaped tank of at most 0.25 $cm^3/(l \times h)$, preferably of at most 0.2 $cm^3/(l \times h)$, even more preferably of at most 0.1 $cm^3/(l \times h)$, and in particular of at most 0.05 $cm^3/(l \times h)$. Said maximum permitted methane infiltration rate for a cylindric shaped tank is measured according to "Rule 110 of the EEC-UNO-Uniform prescriptions relating to authorization: I. Special members for feeding vehicle engines with compressed natural gas (CNG); II. Vehicles equipped with special members of a type authorized for feeding an engine with compressed natural gas (CNG) as regards the installation of these members", Additive 109: rule 110-Complement 6 to the original version of the Rule-Date of entry into force: 18 Jun. 2007", and more particularly in Annex 3, Appendix A, test methods, A21.

This test method is as follows:

"This test is required only for designs of CNG-4 type. A finished bottle should be filled with compressed natural gas or a mixture of 90% nitrogen and 10% helium at the working pressure, placed in a closed chamber and sealed at room temperature. Any presence of a leak should be monitored for a sufficiently long period making it possible to establish a stable infiltration rate. The infiltration rate should be less than 0.25 ml of natural gas or helium per hour per liter (water content) of the bottle".

The liner of the gas storage tank of the invention may have a maximum thickness of 8 mm. It may have a thickness of between 1 and 6 mm and more preferentially between 2 and 4 mm.

While the liner can be made of a multilayer assembly, it is preferably a monolayer structure, wherein said monolayer is preferably made from the composition, as above detailed.

The gas storage tank of the invention may have a storage capacity of less than or equal to 50 l, and in this case it is said to be "of small size". Most particularly, in this case, the copolyamide of the liner, as above detailed, may be free of chain extenders.

The copolyamide with a structure of the random tree type may especially be as described in patent application WO 99/03909.

According to a preferential characteristic of the invention, the radical R is an aromatic radical, $R^1$ and $R^2$ each representing a covalent bond. Furthermore, the B and A functional groups of the formula (I) are respectively an acid functional group and an amine functional group, the number n of acid functional groups advantageously being equal to 2.

Thus, the suitable and preferred multifunctional monomers of the invention are, especially, monomers that are thermally stable at a temperature above 150° C. By way of example, mention may be made of the multifunctional monomers in accordance with formula (I) in which R represents an aromatic radical such as aminophthalic acid, in particular 5-aminoisophthalic acid, or a linear aliphatic radical such as 3-aminopimelic diacid or 6-aminoundecanedioic acid. Mention may also be made of α-amino acids, such as aspartic acid or glutamic acid. Natural amino acids may also be used as multifunctional monomer if their thermal stability is sufficient.

The mole ratio between the multifunctional monomers of formula (I) and the sum of the difunctional monomers of formula (II) and difunctional monomers of formula (III) or (IV) may range from 0.01% to 0.5% and preferably between 0.05% and 0.4%, in particular to obtain a copolyamide having a level of mechanical properties equivalent to that of the corresponding linear polyamide.

Most particularly, the composition comprises a content of multifunctional monomers of formula (I) ranging from 0.1 mol % to 0.5 mol % and in particular from 0.1 mol % to 0.35 mol % relative to the total number of moles of monomers in the copolyamide.

The difunctional monomers of formula (II) are the monomers used for the manufacture of linear thermoplastic polyamides. Thus, mention may be made of the ω-aminoalkanoic compounds comprising a hydrocarbon-based chain containing from 4 to 12 carbon atoms, or the lactams derived from these amino acids, such as ε-caprolactam. The preferred difunctional monomer of the invention is ε-caprolactam. Needless to say, mixtures of these monomers may be used.

Most particularly, the copolyamide of random tree type comprises a content of difunctional monomers of formula (II) ranging from 98 mol % to 99.8 mol % relative to the total number of moles of monomers in the copolymer.

The hydrocarbon-based radicals $R^3$ or $R^4$ of the difunctional monomers of formula (III) or (IV) may comprise from 6 to 20 and especially from 8 to 16 carbon atoms, chosen in particular from:
aliphatic radicals, which are especially linear, branched or cyclic,
substituted or unsubstituted aromatic radicals, and
alkylaryl or arylalkyl radicals.

In particular, the difunctional monomers are aliphatic diacids or primary diamines, i.e. the two amine functions are borne by $sp^3$ carbons. Most particularly, the difunctional monomers are chosen from:
saturated aliphatic dicarboxylic acids containing from 6 to 12 carbon atoms, for instance adipic acid, azelaic acid, sebacic acid or dodecanoic acid,
saturated linear aliphatic, cycloaliphatic, or branched primary diamines containing at least 6 carbon atoms and especially from 6 to 12 carbon atoms; these diamines may be chosen from hexamethylenediamine, trimethylhexamethylenediamine, tetramethylenediamine, isophoronediamine, 1,4-diaminocyclohexane and 2,6-diamino-1-methylcyclohexane, and most particularly isophoronediamine or cycloaliphatic diamines,
primary alkylaromatic diamines, in which the amine functions are borne by an $sp^3$ carbon, for example m-xylylenediamine, abbreviated as MXD.

Most particularly, the composition comprises a content of difunctional monomers of formula (III) or of formula (IV) ranging from 0.001 mol % to 0.5 mol % and in particular from 0.05 mol % to 0.4 mol % relative to the total number of moles of monomers in the copolyamide.

The copolyamide may comprise a mole ratio of difunctional monomer of formula (III) or (IV) relative to the multifunctional monomer of formula (I) ranging from 0.15 to 1, especially from 0.2 to 0.8, or even from 0.3 to 0.7, and in particular of about 0.5.

In particular, the copolymer has a viscosity that is suitable for its use by extrusion blow-moulding. In the case where the copolymer is free of difunctional monomers, care should be taken regarding the polymerization conditions, in particular in the finishing step, in order to arrive at a composition with a high viscosity.

The presence of difunctional monomers may make it possible to obtain polymers with satisfactory or even excellent viscosity levels, even in the case where the polymerization conditions are insufficient, especially in the final finishing phase under vacuum, so as to obtain a melt viscosity that is satisfactory for extrusion blow-moulding.

These difunctional monomers may also make it possible to adjust the contents of end groups in the tree copolymer independently of its molecular weight.

Moreover, the presence of difunctional monomers may make it possible to improve the compatibilization with the elastomers. This may lead to an improvement of the impact strength properties, in particular at low temperature.

Thus, a subject of the invention may also be the use of difunctional monomers as agents for increasing:
the melt viscosity of the tree copolymer and/or
the compatibility with impact modifiers and tree copolymers, the said tree copolymers being obtained by polymerization between at least one, or even solely between:
one or more multifunctional monomers, and
one or more difunctional monomers,
in particular as defined above and/or in the contents and/or ratios defined above.

In particular, the copolyamide comprises, or even consists of:
a multifunctional monomer of formula (I) in a content ranging from 0.1% to 0.5%, the said multifunctional monomer in particular being 5-aminoisophthalic acid,
a difunctional monomer of formula (II) in a content ranging from 98.0% to 99.8%, the said monomer in particular being ε-caprolactam, and
optionally a difunctional monomer of formula (III) or (IV) in a content ranging from 0.05% to 0.45%, the said difunctional monomer in particular being isophoronediamine,
the percentages being molar percentages relative to the total number of moles of monomers of which the copolyamide is composed.

In the present case, the molar percentages are understood relative to the total number of moles of monomers of which the polymer is composed.

Advantageously, the copolyamide has a melt viscosity of greater than or equal to 1500 Pa·s, in particular greater than or equal to 1800 Pa·s, especially greater than or equal to 2000 Pa·s, or even greater than or equal to 2200 Pa·s, at 25 $s^{-1}$ and 270° C.

The copolyamide preferably has a melt flow index, or MFI, of less than 5 g/10 minutes, measured at 275° C. under a 2160 g load, and advantageously a molecular mass distribution index D of greater than 2. The distribution index D for the molecular masses is a function of the degree of polymerization DPn and of the functionality factor F of the polymer.

The polymerization is especially performed according to the standard operating conditions for the polymerization of lactams when this is performed in the absence of the multifunctional monomers.

Such a polymerization process may comprise:
heating with stirring and under pressure of the mixture of monomers and multifunctional monomers,
maintenance of the mixture under pressure and temperature for a given time, with removal of steam by means of a suitable device, followed by decompression and maintenance for a given time at a temperature above the melting point of the mixture, especially under the autogenous pressure of steam, under nitrogen or under vacuum, in order thus to continue the polymerization by removal of the water formed.

It is perfectly possible to carry out the polymerization until the thermodynamic equilibrium of the polyamide is obtained.

The multifunctional and difunctional monomers are preferentially added at the start of the polymerization. In this case, the polymerization of a mixture of difunctional monomers with multifunctional and difunctional monomers is performed.

It is perfectly possible to add normal additives, at the start, during or at the end of the polymerization, such as, for example, catalysts, such as in particular phosphorus-based catalysts, anti-foaming agents and heat or light stabilizers.

On exiting from the polymerization, the polymer can be cooled, advantageously with water, and extruded, and then cut up to produce granules.

The polymerization process according to the invention may entirely be performed in continuous or batch mode, and is advantageously performed in continuous mode, in particular in the case of small liners.

The composition may comprise, besides the modified polyamide of the invention, one or more other polyamides or copolyamides. However, the composition comprises a content of copolyamide of random tree type of greater than or equal to 50% by weight, especially greater than or equal to 60% by weight, in particular greater than or equal to 75% by weight, most particularly greater than or equal to 90% by weight, or even greater than or equal to 95% by weight, relative to the total weight of polymer.

According to an advantageous variant, the composition comprises as sole polyamide, the copolyamide of random tree type only.

The composition according to the invention comprises a polyamide of random tree type as defined previously and at least one impact modifier. These are compounds that are capable of modifying the impact strength of a polyamide composition. These impact modifiers preferentially comprise functional groups which react with the polyamide.

According to the invention, the term "functional groups which react with the polyamide" means groups capable of reacting or of interacting chemically with the acid or amine functions of the polyamide, in particular by covalency, ionic or hydrogen bond interaction or van der Waals bonding. Such reactive groups make it possible to ensure good dispersing of the impact modifiers in the polyamide matrix. Good dispersing is generally obtained with impact modifier particles having a mean size of between 0.1 and 1 μm in the matrix.

Use is preferably made of impact modifiers comprising functional groups which react with the polyamide as a function of the acid or amine nature of the ΔGT of the polyamide. Thus, for example, if the ΔGT is acid, use will preferably be made of reactive functional groups capable of reacting or of interacting chemically with the acid functional groups of the polyamide, in particular by covalency, ionic or hydrogen bond interaction or van der Waals bonding. Thus, for example, if the ΔGT is amine, use will preferably be made of reactive functional groups capable of reacting or of interacting chemically with the amine functional groups of the polyamide, in particular by covalency, ionic or hydrogen bond interaction or van der Waals bonding.

Impact modifiers containing functional groups that are reactive with the polyamide, and especially having a ΔGT of amine nature, are preferentially used.

The impact modifiers can very well comprise in themselves functional groups which react with the polyamide, for example as regards ethylene/acrylic acid (EAA).

It is also possible to add thereto functional groups which react with the polyamide, generally by grafting or copolymerization, for example for ethylene/propylene/diene (EPDM) grafted with maleic anhydride.

Use may be made, according to the invention, of impact modifiers which are oligomeric or polymeric compounds comprising at least one of the following monomers or their mixture: ethylene, propylene, butene, isoprene, diene, acrylate, butadiene, styrene, octene, acrylonitrile, acrylic acid, methacrylic acid, vinyl acetate, vinyl esters, such as acrylic and methacrylic esters and glycidyl methacrylate. These compounds according to the invention can also comprise, in addition, monomers other than those mentioned above.

The base of the impact modifier compound, optionally known as elastomer base, can be selected from the group consisting of: polyethylenes, polypropylenes, polybutenes, polyisoprenes, ethylene-propylene rubbers (EPR), ethylene-propylene-diene (EPDM) rubbers, ethylene and butene rubbers, ethylene and acrylate rubbers, butadiene and styrene rubbers, butadiene acrylate rubbers, ethylene and octene rubbers, butadiene acrylonitrile rubbers, ethylene-acrylic acid (EAA) products, ethylene-vinyl acetate (EVA) products, ethylene-acrylic ester (EAE) products, acrylonitrile-butadiene-styrene (ABS) copolymers, styrene-ethylene-butadiene-styrene (SEBS) block copolymers, styrene-butadiene-styrene (SBS) copolymers, core/shell elastomers of methacrylate-butadiene-styrene (MBS) type, or mixtures of at least two elastomers listed above.

In addition to the groups listed above, these impact modifiers can also comprise, generally grafted or copolymerized, functional groups which react with the polyamide, such as, in particular, the following functional groups: acids, such as carboxylic acids, salified acids, esters in particular, acrylates and methacrylates, ionomers, glycidyl groups, in particular epoxy groups, glycidyl esters, anhydrides, in particular maleic anhydrides, oxazolines, maleimides or their mixtures.

Such functional groups on the elastomers are, for example, obtained by use of a comonomer during the preparation of the elastomer.

Mention may in particular be made, as impact modifiers comprising functional groups which react with the polyamide, of terpolymers of ethylene, acrylic ester and glycidyl methacrylate, copolymers of ethylene and butyl ester acrylate, copolymers of ethylene, n-butyl acrylate and glycidyl methacrylate, copolymers of ethylene and maleic anhydride, styrene-maleimide copolymers grafted with maleic anhydride, styrene-ethylene-butylene-styrene copolymers modified with maleic anhydride, styrene-acrylonitrile copolymers grafted with maleic anhydride, acrylonitrile-butadiene-styrene copolymers grafted with maleic anhydride, and their hydrogenated versions.

Most particularly, as impact modifier, the composition comprises, or even consists of, one or more maleic anhydride-grafted polyolefins. Among the maleic anhydride-grafted polyolefins, mention may be made of maleic anhydride-grafted polyethylenes, maleic anhydride-grafted polypropylenes, maleic anhydride-grafted polybutenes, maleic anhydride-grafted polyisoprenes, maleic anhydride-grafted ethylene-propylene rubbers (EPR), maleic anhydride-grafted ethylene-propylene-diene rubbers (EPDM), maleic anhydride-grafted rubbers of ethylene and of butylene, maleic anhydride-grafted styrene-maleimide copolymers, maleic anhydride-grafted styrene-ethylene-butylene-styrene copolymers, maleic anhydride-grafted styrene-acrylonitrile copolymers, and maleic anhydride-grafted acrylonitrile-butadiene-styrene copolymers, and the hydrogenated versions thereof.

According to an advantageous variant, the composition comprises, or even consists of, as impact modifier, a mixture between:
  a maleic anhydride-grafted polyolefin, among which mention may be made of those listed above, especially in a content ranging from 5% to 20% by weight and in particular ranging from 8% to 15% by weight, and
  an ungrafted polyolefin, chosen especially from polyethylene, polyethylene-polypropylene copolymer, polyethylene-butene copolymer, polyethylene-octene copolymer, polyethylene-butadiene copolymer, in particular in a content ranging from 5% to 20% by weight and in particular ranging from 8% to 15% by weight.

The content of impact modifier(s) in the total composition may range from 5% to 30%, or even from 10% to 30%, preferentially from 10% to 29% and especially from 13% to 28% by weight relative to the total weight of the composition.

The composition according to the present invention comprises a copolyamide with a structure of the random tree type and an impact modifier, and may also comprise a chain extender, especially in the case of a large liner, in particular of greater than 100 l.

The extenders are usually capable of reacting with the amine or acid end groups of the polyamide. Chain extenders contain at least two functions that are capable of reacting with the end groups of the polyamide so as to connect two polyamide chains and thus increase the viscosity of the modified polyamide. The use of bis-lactams is in particular mentioned in U.S. Pat. No. 2,682,526.

Chain extenders according to the invention that may especially be mentioned include those chosen from the group consisting of: dialcohols such as ethylene glycol, propanediol, butanediol, hexanediol, hydroquinone bis-hydroxyethyl ether, diepoxides such as bisphenol A diglycidyl ether, polymers bearing epoxide functions, polymers bearing anhydride functions, bis-N-acyl biscaprolactams, such as isophthaloyl biscaprolactam (IBC), 1,1'-carbonyl biscaprolactam, this DSM product having the name Allinco, adipoyl biscaprolactam (ABC), terphthaloyl biscaprolactam (TBC), diphenyl carbonates, bisoxazolines, oxazolinones, diisocyanates, organic phosphites such as triphenyl phosphite and caprolactam phosphite, bis-ketenimines, and dianhydrides.

The composition, in particular in the case of a large liner, especially greater than 100 l, may comprise a content of polyamide chain extender(s) ranging from 0.5% to 2% by weight and especially ranging from 0.5% to 1.5% by weight relative to the total weight of the composition. The composition may comprise a content of polyamide chain extender (s) ranging from 0.8% to 2.5% by weight and especially ranging from 1% to 1.5% by weight relative to the weight of polyamide.

However, according to a particular embodiment, the composition according to the present invention is free of chain extender. The term "free of" means a content of less than or equal to 0.05% by weight, especially less than or equal to 0.001% by weight relative to the total weight of the composition, and in particular a content of less than or equal to 0.05% by weight, especially less than or equal to 0.001% by weight, relative to the weight of tree polyamide. The term "free of" in particular means 0% by weight relative to the total weight of the composition.

The composition according to the invention can additionally comprise additives normally used in the manufacture of polyamide compositions intended to be moulded. Thus, mention may be made of lubricants, flame retardants, plasticizers, catalysts, light and/or heat stabilizers, antioxidants, antistatic agents, dyes and pigments, including carbon black and nigrosine, matting agents, moulding additives or other conventional additives.

These additives may be added to the modified polyamide via usual means adapted to each filler or additive, for instance during the polymerization or to the cold or molten mixture.

According to a characteristic of the invention, the compositions of the invention are obtained by mixing, generally in a single- or twin-screw extruder, a polyamide in accordance with the invention with the various additives, this mixing being carried out generally in the molten state of the polyamide, followed by extrusion of the mixture in the form of rods, which are subsequently cut up into granules. The moulded parts are subsequently produced by melting the granules produced above and feeding the molten composition into the appropriate moulding, injection-moulding or extrusion devices.

The composition according to the invention is thus used for the manufacture of parts via continuous or batch extrusion blow-moulding techniques, with or without an accumulation head. This is because the low melt flow index of the composition makes it possible to limit the distortions of the parisons during their extrusion, before the blow-moulding step. The present invention also relates to a process for obtaining a gas-impermeable liner by extrusion blow-moulding using a polyamide composition as described in the present description.

Most particularly, the composition is free of nucleating agent, i.e. an agent which, when mixed with the polyamide, enables crystal growth in the molten mixture. This agent may especially be:
  microtalc, and/or
  polyamide with a melting point above the tree polyamide of the invention, especially of greater than or equal to 10° C., in particular 20° C., or even 50° C.

Most particularly, the composition is free of polyamide 46, 4T and/or 410, and/or of microtalc.

According to a particular embodiment, the composition comprises, or even consists of:
  a content of copolyamide of random tree type as defined in the present description ranging from 65% to 90% by weight relative to the total weight of the composition,
  a content ranging from 10% to 34% by weight and especially from 10% to 30% by weight, relative to the total weight of the composition, of impact modifier, especially one or more maleic anhydride-grafted polyolefins, in particular a mixture of maleic anhydride-grafted polyolefin(s) and of ungrafted elastomer(s), in particular as described above, and
  at least one chain extender, in a content ranging from 0.5% to 2% by weight relative to the total weight of the composition, and
  optionally at least one additive in a total content of from 0.5% to 2% by weight relative to the total weight of the composition.

According to another particular embodiment, the composition comprises, or even consists of:
  a content of copolyamide of random tree type as defined in the present description ranging from 65% to 90% by weight relative to the total weight of the composition,
  a content ranging from 10% to 34% by weight and especially from 10% to 30% by weight, relative to the total weight of the composition, of impact modifier, especially one or more maleic anhydride-grafted polyolefins, in particular a mixture of maleic anhydride-grafted polyolefin(s) and of ungrafted elastomer(s), in particular as described above, and
  optionally at least one additive in a total content of from 0.5% to 2% by weight relative to the total weight of the composition,
in particular, this composition is free of chain extender.

The liner of the gas storage tank of the invention is advantageously manufactured by extrusion blow-moulding of the composition as defined above.

The extrusion blow-moulding processes may be performed intermittently or continuously. This second option, according to which the extrusion is performed continuously without interruption of the throughput of the parison, is more widely used for small liners.

For the purposes of the present invention, the term "parison" means that the product is obtained by passing the molten polyamide composition through a die and homogenizing in an extrusion machine whose head terminates with the die. The parison especially has a closed cross section, which is preferably circular or elliptic. The parison is formed by moulding, i.e. by insertion between at least two parts of a mould followed by closure of these parts and pressing at a given temperature and for a given time.

The present invention thus relates to a process for manufacturing the gas storage tank as above detailed comprising manufacturing the polyamide liner by extrusion blow-moulding and assembling the same to structural components.

The extruder screw suitable for manufacturing the polyamide liner may possess following features:
- a single-screw extruder screw comprising at least 3 zones: a feed zone, a compression zone and a homogenization zone;
- a compression zone whose length corresponds to 20% to 40% of the total length of the screw; and/or
- a compression ratio of between 3 and 4.

The tank generally comprises at least a structural component, in addition to the liner as above described. The shape of said structural component is not particularly restricted, provided that it contributes to structural integrity of the gas storage tank and/or to its weatherability. The structural component may be under the form of an outer coating layer on the liner. According to this embodiment, said outer coating layer is in particular a coating layer made from a fibre-reinforced composite material. According to this embodiment, the process for manufacturing the tank advantageously comprises coating said liner with a composite coating layer, the said composite comprising carbon fibres and/or glass fibres. Should the disclosure of any patents, patent applications, and publications which are incorporated herein by reference conflict with the description of the present application to the extent that it may render a term unclear, the present description shall take precedence.

Other details or advantages of the invention will become more clearly apparent in the light of the examples below, which are given solely as a guide.

EXAMPLES

The compounds used are as follows:
polyamide PA6 of random tree type obtained according to patent application WO 99/03909 using 0.185 mol % of 5-aminoisophthalic acid and 99.8% of ε-caprolactam. The polyamide has a melt flow index (MFI) of 5 to 10 g/10 min (according to standard ASTM D1238 under a 2160 g load and at a temperature of 275° C.); and a viscosity index of 200 to 230 ml/g (determined in formic acid according to method PN-EN ISO 307). This random tree polyamide is obtained under optimized conditions, in particular in terms of finishing, and thus has a viscosity suited to the invention; however, random tree copolyamides obtained under less optimized polymerization conditions, in particular with regard to the finishing step, but comprising difunctional monomers, make it possible to obtain equivalent results;
linear polyamide 6 with a VI of 220 ml/g (determined in 90% formic acid according to standard ISO 307) obtained via the PCS process (post-polymerization condensation at solid state);

Impact modifier: Exxelor VA1801 (maleic anhydride-grafted ethylenic copolymer); Bondyram 7103 (maleic anhydride-grafted ethylenic copolymer); Exact 9071 (ungrafted ethylenic copolymer);

Chain extender: Araldite GT7071 phenolic resin of Novolac S type additives: EBS wax, masterbatch of 50% carbon black in polyethylene and masterbatch of 40% nigrosine in PA6 and also heat stabilizers in masterbatch form.

Polyamide formulations are manufactured by melt-blending the following in a Werner & Pfleiderer ZSK 40 type twin-screw extruder with degassing (L/D=36):
- tree type polyamide PA6,
- 20% to 25% by weight of impact modifiers,
- 0 or 1% by weight of chain extender,
- 0 or 5% by weight of Novolac S and
- 2% by weight of other ingredients such as stabilizers, lubricants and dyes (carbon black and nigrosine).

The extrusion parameters are as follows: extrusion temperature with an increasing profile 250-270° C.; rotational speed of the screw: 250 rpm; composition throughput 40 kg/h.

TABLE 1

| Formulations (as a weight percentage relative to the total weight) | 1 | 2 | 3 | 4 | 5 | CE-1 | CE-5 |
|---|---|---|---|---|---|---|---|
| Tree PA6 | 78 | 78 | 73 | 72 | 68 | 100 | |
| linear PA6 | | | | | | | 68 |
| Elastomer VA1801 | 20 | | 25 | 25 | 25 | | 25 |
| Bondyram 7103 | | 10 | | | | | |
| Exact9071 | | 10 | | | | | |
| Araldite | | | | | 1 | | |
| Novolac S | | | | | 5 | | 5 |

Various mechanical, rheological and gas-barrier properties were measured on these formulations, and the results are given in the table below.

TABLE 2

| Formulations | 1 | 2 | 3 | 4 | 5 | CE-1 | CE-5 |
|---|---|---|---|---|---|---|---|
| MFI in g/10 min (10 kg, 275° C.) | 11 | 5 | 1.2 | 0.5 | 3.5 | nm | 22 |
| Notched Charpy impact, 23° C. (kJ/m$^2$) | 105 | 108 | 118 | 120 | 113 | 6 | 68 |
| Notched Charpy impact −40° C. (kJ/m$^2$) | 31 | 29 | 61 | 60 | 58 | 4 | 28 |
| Viscosity (Pa · s) at 25 s$^{-1}$ and 270° C. | 2550 | 3300 | 5100 | 6100 | 4500 | 1100 | 1150 |
| CH$_4$ permeability Ncm$^3$/(m$^2$/h)(*) | 0.25 | nm | nm | nm | nm | 0.2 | nm | nm means "not measured"
(*) measured on flat plates having 2 mm thickness

The flow index (MFI) is measured according to standard ISO 1133; the notched Charpy impact is measured according to standard ISO 179-1/1eA; the CH$_4$ permeability was performed according to In-house procedure of TesTneT Engineering GmbH D-80802 Munich: #110315_stu_Prüfanweisung Plattenpermeation CH$_4$ Rev02.

The melt viscosity is measured using a Göttfert 2002 capillary rheometer. A piston, moving at programmed speeds, pushes the molten polymer through a capillary of length L (30 mm) and diameter D (1 mm). The corresponding flow rate is measured, from which the apparent viscosity can be deduced. A shear gradient scan from 5000 s$^{-1}$ to 10 s$^{-1}$ is performed.

The composition examples according to the invention show a high increase in the apparent viscosity at a shear gradient of 25 s$^{-1}$ relative to compositions free of impact modifier, and relative to compositions of linear polyamides and of impact modifier (CE-1 and CE-5).

A combination of tree PA6 with a mixture of maleic anhydride-grafted elastomer and of ungrafted elastomer leads to a formulation that has excellent rheological properties.

The addition of a chain extender to a tree PA6 polyamide comprising 25% elastomer leads to an increase of about 20% in the apparent viscosity.

The addition of a Novolac type resin, known in the prior art as having fuel-barrier properties, to a proportion of 5% by mass does not have a drastic influence on either the mechanical properties or the apparent viscosity of the formulation.

The high viscosity obtained allows easy manufacture of articles by extrusion blow-moulding, especially of large articles, and leads to very good quality of the articles obtained. In addition, most particularly in the case where the impact modifier is a mixture of maleic anhydride-grafted elastomer with an ungrafted elastomer with tree-type PA6, the cost of the composition is particularly attractive.

The compositions according to the invention have both excellent impact strength, especially at −40° C., and high viscosity, especially in comparison with compositions of linear PA (having a VI comparable to that of the tree PA) and of impact modifier or of branched PA alone.

The invention claimed is:

1. A gas storage tank, comprising a liner, wherein the liner comprises a composition comprising:
   a) a copolyamide having a structure of the random tree type, which is the result of the reaction between at least:
      at least one multifunctional monomer corresponding to the general formula I below:

(AR$^1$)—R—(R$^2$B)$_n$ (I)

in which:
      n is an integer between 2 and 10, limits inclusive,
      R$^1$ and R$^2$ are identical or different and represent a covalent bond, an aliphatic, arylaliphatic, aromatic or alkylaromatic hydrocarbon-based radical,
      R is a linear or branched aliphatic radical, a substituted or unsubstituted cycloaliphatic radical, a substituted or unsubstituted aromatic radical which optionally comprises several aromatic nuclei and/or heteroketones,
      A represents an amine or amine salt function, or an acid, ester, acid halide or amide function, and
      B represents an amine or amine salt function when A represents an acid, ester, acid halide or amide function, and an acid, ester, acid halide or amide function when A represents an amine or amine salt function,
      at least one difunctional monomer of formula II below or a corresponding lactam:

A$^1$-R$^5$—B$^1$ (II)

in which:
      A$^1$ and B$^1$ represent, respectively, an acid, ester or acid chloride function, and an amine or amine salt function, and R$^5$ represents linear or branched alkyl, substituted or unsubstituted aromatic, alkylaryl, arylalkyl or cycloaliphatic hydrocarbon-based radicals which optionally comprise unsaturations,
   optionally at least one difunctional monomer of formula (III) when B is an amine or equivalent function, or a monomer of formula (IV) when B represents an acid or equivalent function, A$^1$-R$^3$-A$^1$ (III) or

B$^1$—R$^4$—B$^1$ (IV)

in which:
   A$^1$ and B$^1$ are each as defined above, and
   R$^3$ and R$^4$ represent linear or branched alkyl, substituted or unsubstituted aromatic, alkylaryl, arylalkyl or cycloaliphatic hydrocarbon-based radicals which optionally comprise unsaturations,
   wherein the copolyamide content ranges from 65% to 90% by weight relative to the total weight of the composition;
   b) at least one impact modifier;
   c) optionally at least one chain extender; and
   d) optionally from 0 to 5% of additives.

2. The tank of claim 1, wherein the radical R is an aromatic radical.

3. The tank according to claim 1, wherein the monomer of formula (I) is a compound in which A represents an amine function, B represents an acid function, n is equal to 2 and R represents an aromatic radical, R$^1$ and R$^2$ represent a covalent bond.

4. The tank according to claim 1, wherein the monomer of formula (I) is 5-aminoisophthalic acid.

5. The tank according to claim 1, wherein the monomer of formula (I) is 6-aminoundecanedioic acid.

6. The tank according to claim 1, wherein the content of multifunctional monomers of formula (I) ranges from 0.1 mol % to 0.5 mol % relative to the total number of moles of monomers in the copolyamide.

7. The tank according to claim 1, wherein the copolyamide comprises a content of difunctional monomers of formula (II) ranging from 98 mol % to 99.8 mol % relative to the total number of moles of monomers in the copolymer.

8. The tank according to claim 1, wherein the copolyamide comprises a content of difunctional monomers of formula (III) or of formula (IV) ranging from 0.001 mol % to 0.5 mol % relative to the total number of moles of monomers in the copolyamide.

9. The tank according to claim 8, wherein the copolyamide comprises a content of difunctional monomers of formula (III) or of formula (IV) ranging from 0.05 mol % to 0.4 mol % relative to the total number of moles of monomers in the copolyamide.

10. The tank according to claim 1, wherein the copolyamide comprises a mole ratio of difunctional monomer of formula (III) or (IV) relative to the multifunctional monomer of formula (I) ranging from 0.15 to 1.

11. The tank according to claim 1, wherein the composition is free of chain extender.

12. The tank according to claim 1, wherein the at least one impact modifier is an impact modifier containing functional groups reacted with the polyamide.

13. The tank according to claim 1, wherein the at least one impact modifier comprises one or more maleic anhydride-grafted polyolefins.

14. The tank according to claim 13, wherein the at least one impact modifier comprises-one or more maleic anhydride-grafted polyolefins selected from the group consisting of maleic anhydride-grafted polyethylenes, maleic anhydride-grafted polypropylenes, maleic anhydride-grafted polybutenes, maleic anhydride-grafted polyisoprenes, maleic anhydride-grafted ethylene-propylene rubbers (EPR), maleic anhydride-grafted ethylene-propylene-diene rubbers (EPDM), maleic anhydride-grafted rubbers of ethylene and of butylene, maleic anhydride-grafted styrene-maleimide copolymers, maleic anhydride-grafted styrene-ethylene-butylene-styrene copolymers, maleic anhydride-grafted styrene-acrylonitrile copolymers, and maleic anhydride-grafted acrylonitrile-butadiene-styrene copolymers, and the hydrogenated versions thereof.

15. The tank according to claim 1, wherein the impact modifier is a mixture of:
a maleic anhydride-grafted polyolefin, and
an ungrafted polyolefin.

16. The tank according to claim 15, wherein the impact modifier comprises a mixture of from 5% to 20% by weight of a maleic anhydride-grafted polyolefin and from 5% to 20% by weight of an ungrafted polyolefin, wherein percentages by weight are relative to the total weight of the composition.

17. The tank according to claim 16, wherein the ungrafted polyolefin comprises an ungrafted polyolefin selected from the group consisting of polyethylenes, polyethylene-polypropylene copolymers, polyethylene-butene copolymers, polyethylene-octene copolymers, polyethylene-butadiene copolymers.

18. A process for manufacturing the gas storage tank according to claim 1, comprising manufacturing the liner of the tank by blow-moulding or extrusion blow-moulding, and assembling the liner and structural components of the tank.

19. The process of claim 18, said process comprising coating said liner with a composite coating layer, the said composite comprising carbon fibres and/or glass fibres.

* * * * *